Aug. 20, 1963 H. M. PENNINGROTH 3,101,225
RADIOTELEPHONE CABINET
Filed June 27, 1960
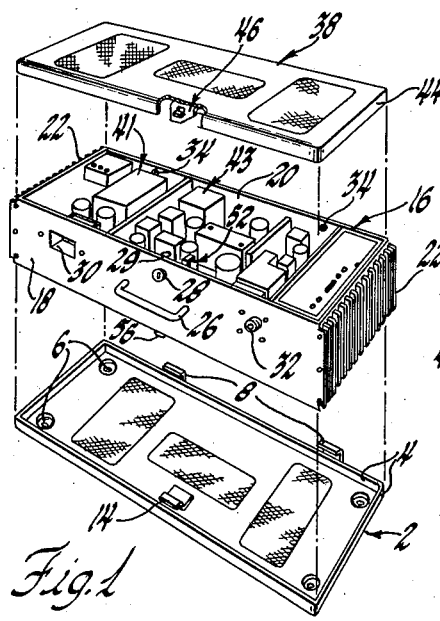
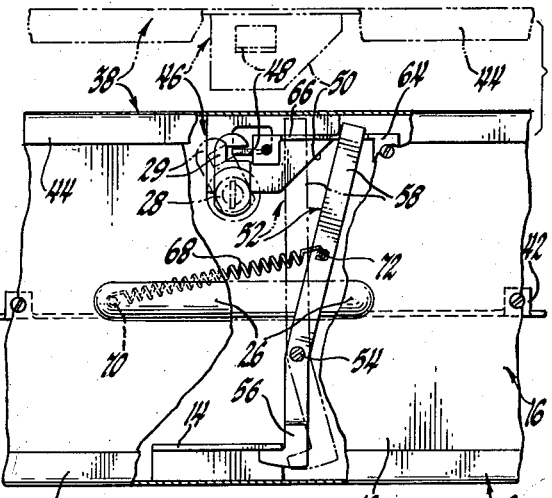
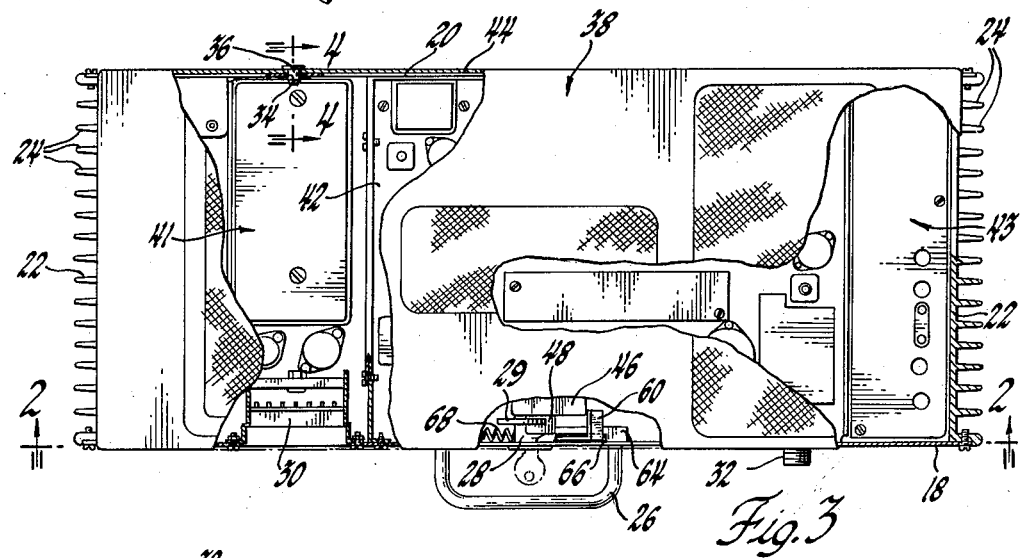
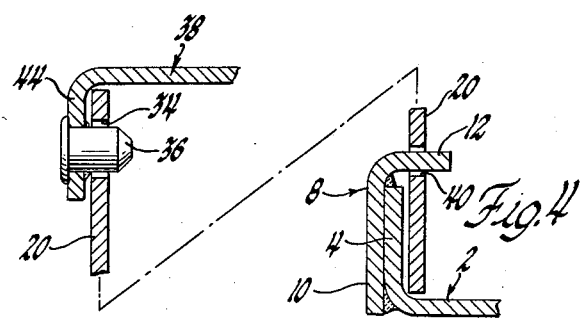
INVENTOR.
Herbert M. Penningroth
BY
Paul J. Ethington
ATTORNEY United States Patent Office 3,101,225
Patented Aug. 20, 1963

3,101,225
RADIOTELEPHONE CABINET
Herbert M. Penningroth, Hales Corners, Wis., assignor to General Motors Corporation, Detroit, Mich., a corporation of Delaware
Filed June 27, 1960, Ser. No. 39,021
3 Claims. (Cl. 312—222)

This invention relates to a cabinet and more particularly to a cabinet for encasing and supporting automotive radiotelephone equipment.

Heretofore, there has been a problem of securely mounting electronic equipment within the trunk or other compartment of a vehicle and at the same time providing means for readily removing the equipment so that it may be conveniently serviced and replaced within the vehicle. It is important to be able to gain access to the radiotelephone equipment in a minimum of time and yet have the housing locked to prevent opening by unauthorized persons.

Accordingly, an object of this invention is to provide a cabinet which is easily and rapidly opened to permit removal of the chassis as well as to be readily reassembled. Further, this invention affords a simple, sturdy housing which is locked when mounted in a vehicle.

The invention is accomplished by providing a three part cabinet having a base plate mountable on a vehicle floor, a four-sided box containing and supporting the electronic equipment mounted on the base plate, a cover plate for the box and latch means for securing the three parts together in a rigid unit. The latch means comprises a lever pivoted relative to one of the said parts carrying a bolt portion for engaging a keeper mounted on another of the parts and a portion coacting with a cam on the third part for swinging the bolt into latched position when three parts are assembled.

The above and other advantages of the invention will be made more apparent from the following description, when considered in conjunction with the accompanying drawings, in which like numerals refer to like parts, and in which:

FIGURE 1 is a perspective view showing a disassembled cabinet constructed according to the invention;

FIGURE 2 is a partly broken away fragmentary view taken along line 2—2 of FIGURE 3 illustrating the latch arrangement according to the invention;

FIGURE 3 is a partly broken away plan view of the assembled housing showing details of the chassis mounting within the cabinet; and FIGURE 4 is a cross-sectional view taken along line 4—4 of FIGURE 3 showing the separable hinge arrangements.

Referring to FIGURE 1, the radiotelephone cabinet comprises a rectangular base plate 2 having an upturned flange 4 along its periphery, and having downwardly embossed portions 6 providing means for bolting the base plate 2 to the floor of a vehicle. Two L-shaped hinge members 8 each have one leg 10 welded to the rear portion of the flange 4 with the other leg 12 turned toward the front of the base plate 2. A Z-shaped keeper 14 is welded to the base plate 2 near the front edge thereof for cooperation with a latch to be described.

A four-sided box 16 which is adapted to seat within the flange 4 on the base 2 comprises front and back sheet metal panels 18 and 20 respectively secured to two cast metal end portions 22 by screws. The end portions are formed into fins 24 to provide a heat sink for the electronic equipment which is carried within the box 16. The front panel 18 supports a carrying handle 26, a key operated lock 28, an electrical connection plug 30 and a screw threaded adapter 32 for an antenna plug. The rear panel of the box includes two holes 34 near its upper edge for engagement with hinge pins 36 located on the cover 38 and, as best shown in FIGURE 4, also has a pair of slots 40 near its lower edge to cooperate with the L-shaped hinge members 8 mounted on the base 2. Various radio components such as a power supply 41 and a transmitter 43 are secured to a chassis 42 which in turn is secured within the box 16 by means of screws.

A cover 38 has a downwardly turned flange 44 along its periphery adapted to fit over the top of the box 16. A pair of pins 36, as shown in FIGURES 3 and 4, are secured to the rear portion of the cover flange 44 for engagement with the holes 34 in the rear panel 20 of the box. As best shown in FIGURE 2, an L-shaped cam plate 46 is welded to the cover near and parallel to the front portion of the flange 44. A portion of the cam plate 46 is struck out perpendicularly to the main body thereof to form a keeper 48 for a latch to be described, and one edge of the plate 46 is inclined to form a cam surface 50.

A latch lever 52 pivoted at 54 to the inside of the front panel 18 of the box carries a depending foot-shaped bolt portion 56 and an upwardly extending leg portion 58 terminating in a tab turned at a right angle thereto. The tab 60 is positioned to coact with the cam plate 46 thereby acting as a cam follower. The foot shaped bolt 56 engages the keeper 14 on the base 2 thereby holding the box 16 onto the base. The key-operated lock 28 on the front panel of the box operates a swinging bolt 29 which will engage the struck out keeper 48 on the cam plate 50 when the cover 38 is latched onto the box 16. In order to retain the latch lever 52 within its operating range, a C-shaped bracket 64 secured to the front panel 18 defines a slot 66 which receives the latch lever and permits limited movement thereof.

It may readily be seen that the cabinet is assembled by placing the box 16 on the base plate 2 so that the L-shaped hinge members 8 will engage the slots 40 in the rear panel 20 of the box, placing the cover 38 on the box 16 so that the pins 36 in the rear portion of the cover flange 44 will engage the holes 34 in the rear panel 20 of the box and then turning the key-operated bolt 29. During the placing of the cover 38 on the box 16, the inclined edge 50 of the cam plate will push against the latch lever 52 thereby causing the lever to pivot in a clockwise direction so that the bolt 56 engages the keeper 14 on the base plate. Rotation of the key-operated bolt 29 in the clockwise direction will then secure the cover 38 to the box. This action is illustrated in FIGURE 2 wherein the dotted lines show the unlatched position of the mechanism and the full lines indicate the latched position. Hence the entire assembly is held by the hinge assemblies at the rear and the latch mechanism in front to form a rigid unit. Of course, to remove the box 16 from the cabinet it is necessary merely to reverse the above procedure. If desired, a coil spring 68 connected between the handle retaining screw 70 and a struck out tab 72 on the latch lever 52 may be used to bias the latch lever 52 in a counterclockwise direction so that the box will be automatically unlatched from the base as soon as the cover plate 38 is lifted.

This invention, therefore, provides a simple housing and latch arrangement which will permit easy and rapid removal of the electronic equipment for servicing. When the box is removed from the cabinet, the equipment is accessible through the open top and bottom of the box thereby permitting testing and replacement of parts without disassembly of the entire box portion.

Although a preferred embodiment of the invention has been described and illustrated, it is to be understood that modifications may be made in the structural details thereof without departing from the broader spirit and scope of the invention, as defined in the appended claims.

I claim:
1. A cabinet for electronic equipment comprising a base plate; a separate four-sided box adapted to seat on said base plate; a separate cover plate for closing the top of the box; and latch means for securing the box to the two said plates including a keeper secured to said base plate, a lever pivoted on the front panel of said box having a bolt portion for engaging said keeper and a leg portion extending toward the cover, a cam plate secured to said cover and positioned to engage the lever arm for moving said bolt portion into engagement with said keeper when the cover is placed on the box, a second keeper mounted on said cam plate, and a key-operated swinging bolt on said front panel adapted to latchingly engage said second keeper.

2. A cabinet for electronic equipment comprising a base plate; a separate four-sided box removably seated on said base plate, said box having front and rear panels secured to cast metal end panels, said end panels having heat dissipating fins formed thereon to serve as a heat sink for said electronic equipment; a separate cover plate for closing the top of the box, and latch means for securing the two said plates to the box including a keeper secured to said base plate, a lever pivoted on the front panel of said box having a bolt portion for engaging said keeper and a leg portion extending toward the cover, a cam plate secured to said cover and positioned to engage the lever arm for moving said bolt portion into engagement with said keeper when the cover is placed on the box, a second keeper mounted on said cam plate, and a key-operated swinging bolt on said front panel adapted to latchingly engage said second keeper.

3. A cabinet for electronic equipmnet comprising a base plate having an upturned flange around the periphery thereof; a four-sided box seated within said flange; separable hinge means connecting said box to said base plate; a cover plate having a downturned flange around the periphery thereof removably seated over said box, the downturned flange surrounding said box; separable hinge means connecting said cover plate to said box; and latch means for securing the two said plates to the said box comprising a keeper secured to said base plate, a lever pivoted on said box having a foot shaped bolt portion for engaging said keeper and a leg portion extending toward the cover, a cam secured to said cover and positioned to engage the leg portion of the lever arm for moving said bolt portion into engagement with said keeper when the cover is placed on the box, a second keeper connected with said cover, and a key-operated swinging bolt on said front panel adapted to latchingly engage said second keeper.

References Cited in the file of this patent

UNITED STATES PATENTS

| Re 7,623 | Beidler | Apr. 24, 1887 |
| 159,583 | Key | Feb. 9, 1875 |
| 886,345 | Burns | May 5, 1908 |
| 1,766,701 | Blackmore | June 24, 1930 |
| 2,229,007 | Showers | June 14, 1941 |
| 2,286,427 | Levensten | June 16, 1942 |
| 2,629,764 | Wiley | Feb. 24, 1953 |